Patented Jan. 5, 1926.

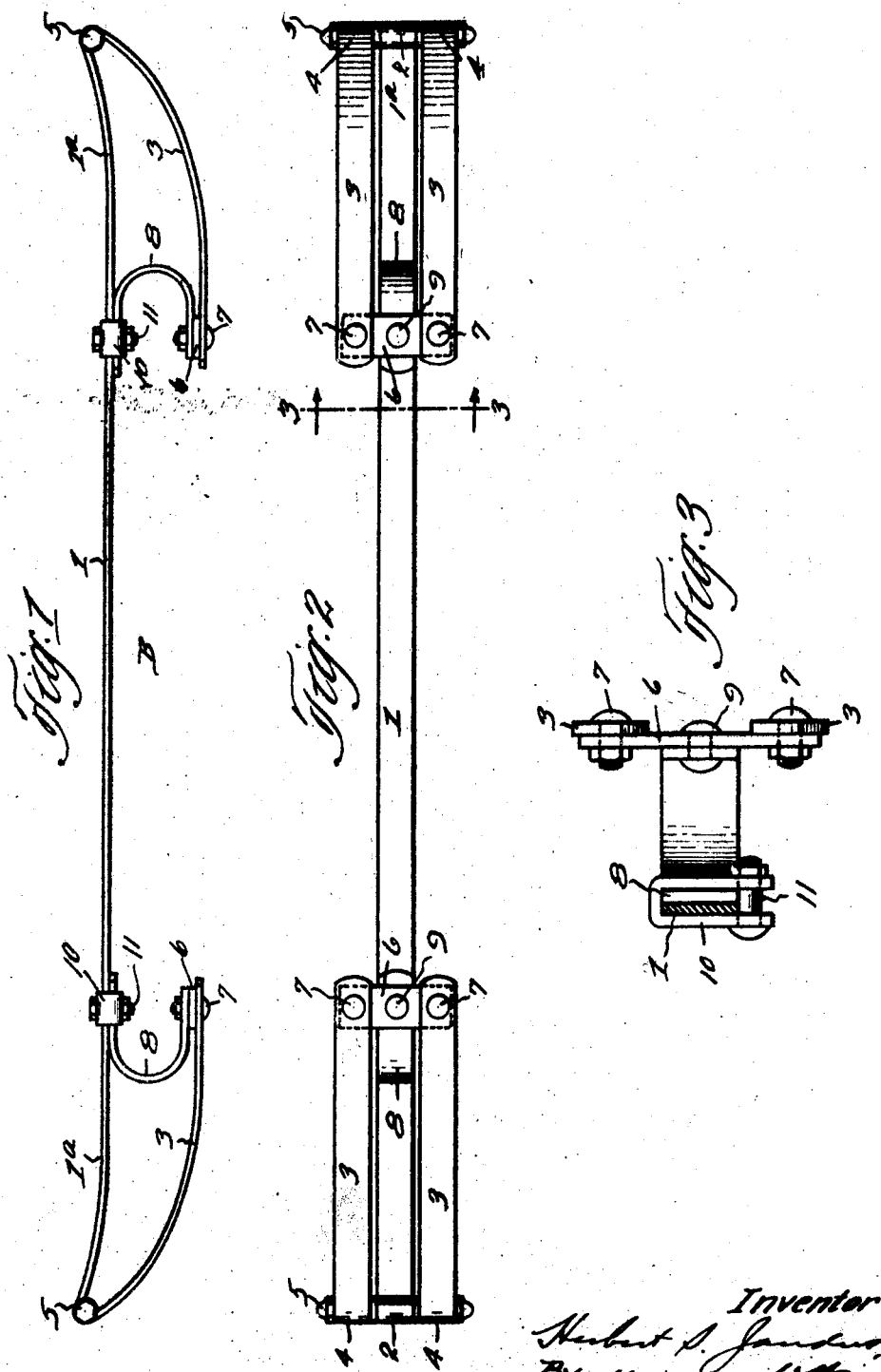

1,568,557

UNITED STATES PATENT OFFICE.

HERBERT S. JANDUS, OF DETROIT, MICHIGAN, ASSIGNOR TO THE C. G. SPRING & BUMPER COMPANY, OF DETROIT, MICHIGAN, A CORPORATION OF DELAWARE.

BUMPER.

Application filed March 31, 1924. Serial No. 703,026.

*To all whom it may concern:*

Be it known that I, HERBERT S. JANDUS, a citizen of the United States, residing at Detroit, in the county of Wayne and State of Michigan, have invented a certain new and useful Improvement in Bumpers, of which the following is a full, clear, and exact description, reference being had to the accompanying drawings.

This invention relates to bumpers, and more particularly to combined bumpers and fender guards, adapted to be applied to the rear ends of automobiles and similar vehicles.

The invention disclosed herein is embodied in a bumper and fender guard wherein a space or pocket is provided, between the body of the bumper and the fender-guard portions thereof, for the reception of a spare tire, an instance of a bumper of this type being shown in Patent No. 1,476,605, issued December 4, 1923, to Christian Girl and Wayne E. Duston.

It is the general purpose and object of the invention to provide a combined bumper and fender guard of the foregoing type which shall be simple in construction and inexpensive of production, and one wherein the inner ends of the fender-guard portions of the bumper will be resiliently supported, thereby increasing the efficiency of such portions.

I accomplished the foregoing objects in and through the construction shown in the drawings forming part hereof wherein Fig. 1 represents a plan view of a bumper embodying my invention; Fig. 2 an elevation of said bumper; and Fig. 3 a sectional detail corresponding to line 3—3 of Fig. 2.

Describing the various parts by reference characters, 1 denotes a bar of resilient spring steel, said bar being of sufficient length to extend entirely across the rear of an automobile and across the fenders thereof, the ends of the said bar being bent slightly forwardly, as indicated at 1ª, and being each provided with an eye 2.

Cooperating with the end portions of the bar 1 are upper and lower spring-plate bars 3. Each of these bars is provided with an eye 4 at its outer end, the eyes of the bars 3 at each end of the structure registering with the corresponding eye 2 and being secured thereto by means of a bolt 5. The bars 3 are curved rearwardly and inwardly having their inner end portions substantially parallel with the portions of the bar 1 in front thereof. The inner ends of the bars 3 are connected by a plate 6, preferably by means of bolts 7. The intermediate portion of each plate 6 is connected to the portion of the bar 1 opposite thereto by means of a resilient U-shaped bar or strap 8, preferably riveted at one end to the plate 6, as indicated at 9, and having its other end secured to the bar 1, preferably by means of an inverted U-shaped clamp 10, the lower ends whereof are connected by a bolt 11. Each connecting bar or strap is preferably arranged with the loop thereof projected outwardly, or toward the bolt 5 adjacent thereto.

The construction disclosed herein is relatively cheap of production owing to the fact that each of the plates 3 is provided with an eye at one end only thereof. By using the U-shaped bar or strap 8 to connect the inner ends of the bars 3 to the bar 1, a blow received by the bars 3 will be cushioned by such strap and transmitted to the bar 1, increasing the efficiency of the said bars 3 in protecting the fenders with which they cooperate. Under compression, the loop of each bar 8 will be elongated outwardly, increasing the bearing of such bar bar upon the bar 1 and thereby increasing the efficiency of the assembly in absorbing blows received by the fender-guard portions of the bumper.

By varying the space between the arms of the loops 8, the bars 3 may be spaced at different distances from the bar 1, thereby to provide between the fender-guard portions of the bumper a tire-receiving pocket of varying depth—sufficient to accommodate one or more tires, as desired.

Having thus described my invention, what I claim is:—

1. A bumper comprising a bar adapted to extend across the rear of a vehicle, an upper and a lower bar each secured at an end to, and respectively above and below, each end of the first-mentioned bar, the said upper and lower bars projecting inwardly and rearwardly from such ends of the first bar, and a resilient connection between the inner ends of each pair of second and third bars and the portion of the first bar adjacent thereto.

2. A bumper comprising a bar adapted to extend across the rear of a vehicle, an upper and a lower bar each secured at an end to, and respectively above and below, each end of the first mentioned bar, the said upper and lower bars projecting inwardly and rearwardly from such ends of the first bar, and a U-shaped resilient bar connected to the first-mentioned bar and to the inner ends of each pair of second and third bars.

3. A bumper comprising a bar adapted to extend across the rear of a vehicle and having secured to each end thereof, and respectively above and below the same, a pair of bars, each pair of bars extending inwardly and rearwardly from an end of the first-mentioned bar and having their inner ends spaced from the first-mentioned bar to provide therewith a space or pocket for the reception of one or more tires, and means resiliently spacing the inner ends of the last-mentioned bars from the corresponding portions of the first-mentioned bar.

4. A bumper comprising a bar adapted to extend across the rear of a vehicle and having secured to each end thereof, and respectively above and below the same, a pair of bars, each pair of bars extending inwardly and rearwardly from an end of the first-mentioned bar and having their inner ends spaced from the first-mentioned bar to provide therewith a space or pocket for the reception of one or more tires, and a U-shaped resilient plate interposed between and connecting the ends of each pair of the last-mentioned bars to the portion of the first-mentioned bar adjacent thereto.

5. A bumper comprising a bar adapted to extend across the rear of a vehicle and having secured to each end thereof, and respectively above and below the same, a pair of bars, each pair of bars extending inwardly and rearwardly from an end of the first-mentioned bar and having their inner ends spaced from the first-mentioned bar to provide therewith a space or pocket for the reception of one or more tires, a plate connecting the inner ends of each pair of upper and lower bars, and a resilient U-shaped bar or plate connected at one end to the central portion of each such connecting plate and detachably connected at its opposite end to the first-mentioned bar.

6. A bumper comprising a bar adapted to extend across the rear of a vehicle, a pair of bars each connected at one end to an end of the first-mentioned bar and extending inwardly and rearwardly therefrom, and means for resiliently connecting the inner end of each of the said pair of bars to the first-mentioned bar.

7. A bumper comprising a bar adapted to extend across a fender, a pair of bars each connected at one end to an end of the first-mentioned bar and extending inwardly and rearwardly therefrom, and a resilient U-shaped plate connecting the inner end of each of the said pair of bars to the first-mentioned bar.

8. A fender guard comprising a front bar, a rear bar connected at its outer end to the front bar and extending inwardly and rearwardly from such point of connection, and a resilient U-shaped plate connecting the inner end of the second bar to the portion of the first bar adjacent thereto.

9. A fender guard comprising a front bar adapted to extend across a fender, an upper and a lower bar secured at their outer ends to the outer end of the first-mentioned bar and extending inwardly and rearwardly therefrom, and means resiliently supporting the inner ends of the last two bars from the first-mentioned bar.

10. A fender guard comprising a front bar adapted to extend across a fender, an upper and a lower bar secured at their outer ends to the outer end of the first-mentioned bar and extending inwardly and rearwardly therefrom, and a resilient U-shaped member connecting the inner ends of the second-mentioned bars to the adjacent portion of the first-mentioned bar.

In testimony whereof, I hereunto affix my signature.

HERBERT S. JANDUS.